United States Patent
Neogi

(10) Patent No.: US 7,336,841 B2
(45) Date of Patent: Feb. 26, 2008

(54) FINGERPRINTING DIGITAL VIDEO FOR RIGHTS MANAGEMENT IN NETWORKS

(75) Inventor: Raja Neogi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 673 days.

(21) Appl. No.: 10/808,981

(22) Filed: Mar. 25, 2004

(65) Prior Publication Data

US 2005/0213826 A1 Sep. 29, 2005

(51) Int. Cl.
*G06K 9/36* (2006.01)
(52) U.S. Cl. .................................................... 382/245
(58) Field of Classification Search ................ 382/115, 382/278, 124–127, 284; 396/15; 340/5.53, 340/5.83; 713/186; 902/2, 3
See application file for complete search history.

(56) References Cited

U.S. PATENT DOCUMENTS

| | | | |
|---|---|---|---|
| 6,597,802 B1* | 7/2003 | Bolle et al. ................. | 382/124 |
| 7,194,115 B2* | 3/2007 | Uchida ........................ | 382/124 |
| 7,194,116 B2* | 3/2007 | Du et al. ..................... | 382/124 |
| 7,197,168 B2* | 3/2007 | Russo ......................... | 382/125 |
| 7,212,658 B2* | 5/2007 | Du et al. ..................... | 382/124 |

\* cited by examiner

*Primary Examiner*—Jose L. Couso
(74) *Attorney, Agent, or Firm*—Schwegman, Lundberg & Woessner, P.A.

(57) ABSTRACT

Systems and methods generate video fingerprints for video data streams. A collection of sub-fingerprints constitute a fingerprint block. The size and temporal position of the block is chosen to represent the video that is being served. The video server has prior information about the video semantics. Based on this information, the server generates control codes that identify which blocks, based on time/byte offsets, in the sequence best represent the video object. The video receiver is equipped with facilities to generate these fingerprint blocks. The block(s) are sent back to the server. The server is equipped with facilities to verify and record the mismatches with respect to references. The mismatch statistics may be archived for use in a number of applications.

24 Claims, 6 Drawing Sheets

FINGERPRINTING DIGITAL VIDEO FOR RIGHTS MANAGEMENT IN NETWORKS

FIELD

The present invention relates generally to systems for rights management for digital video, and more particularly to fingerprinting digital video transmitted over networks.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright ©2003, 2004 Intel Corporation. All Rights Reserved.

BACKGROUND

With the rapid growth of networking infrastructure and bandwidth capabilities, the volume of digital media traffic transmitted over distribution channels such as public and private networks has climbed dramatically. More and more digital content is produced and consumed in home networks, broadcast networks, enterprise networks etc. However, the growth of digital media traffic has come with a corresponding growth in the digital piracy rate. As a result, there is a need by many broadcast network operators and other digital rights owners for copyright protection and enforcement mechanisms for media transmitted over various distribution channels.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the various embodiments of the invention, and it is to be understood that other embodiments may be utilized and that logical, mechanical, electrical and other changes may be made without departing from the scope of the present invention. The following detailed description is, therefore, not to be taken in a limiting sense.

In the Figures, the same reference number is used throughout to refer to an identical component which appears in multiple Figures. Signals and connections may be referred to by the same reference number or label, and the actual meaning will be clear from its use in the context of the description.

Operating Environment

Figure 1:
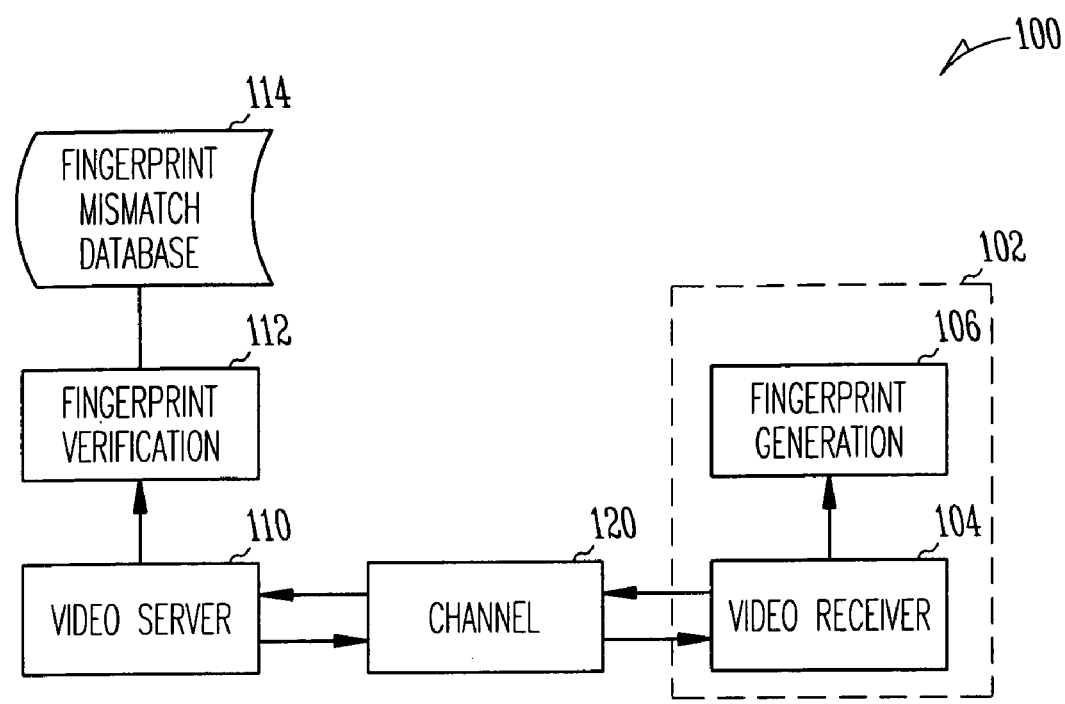
FIG. 1 is a block diagram illustrating an overview of a system incorporating embodiments of the invention.

FIG. 1 is a block diagram of the major components of a hardware and software operating environment 100 incorporating various embodiments of the invention. The systems and methods of the various embodiments of the invention may be incorporated on any hardware or software system that can transmit and receive a video data stream over a network. Generally such hardware includes set top boxes, personal computers, server computers, and laptop computers. However, other computing devices such as portable handheld computers, personal digital assistants (PDAs), and network enabled cellular telephones, and hybrids of the aforementioned devices may also be able to receive video data streams.

In some embodiments of the invention, operating environment 100 comprises a video server 110 and a video receiver 102 communicably coupled via a channel 120. Video server 110 may be any type of system capable of storing and transmitting video data to one or more video receivers 102 through channel 120.

Channel 120 may be any channel that may send and received video data and data associated with the video data. Examples of such channels include public and private networks (both wired and wireless), the Internet, and broadcast channels such as cable television networks and satellite distribution networks. Channel 120 may comprise multiple media, and transmission and reception need not occur over the same media. For example, in the case of satellite distribution networks, video data may be transmitted by satellite, while other data may be received through a different media such as a telephone or network channel.

Video receiver 102 may be any system capable of receiving video data and transmitting fingerprint data to a verification module 112. For example, video receiver 120 may be a personal computer, a laptop computer, or a set-top box capable of receiving video data. Video receiver 102 includes a fingerprint generation module 106 capable of generating a fingerprint from a video data stream transmitted to video receiver 102. In some embodiments, the generated fingerprint may be transmitted to a fingerprint verification module 112.

Verification module 112 may be a module incorporated on video server 110, or it may be incorporated on a separate computing system from video server 110 that is also communicably coupled to channel 120. The fingerprint verification module 112 compares the fingerprint generated by video receiver 102 with a reference fingerprint for the video data stream that may be archived in fingerprint mismatch database 114.

Further details on the operation of embodiments of the invention are provided below with reference to FIGS. 2A and 2B.

The software components running in the operating environment 100 may be read from a machine-readable media and run under the control of an operating system, and interfaced with the operating system. Examples of such machine-readable media include hard disks, floppy disks, CD-ROMs, DVD-ROMs. Further, machine-readable media includes wired and wireless signals transmitted over a network.

Additionally, in varying embodiments the systems and methods of the present invention may be implemented in firmware.

Figure 2A:
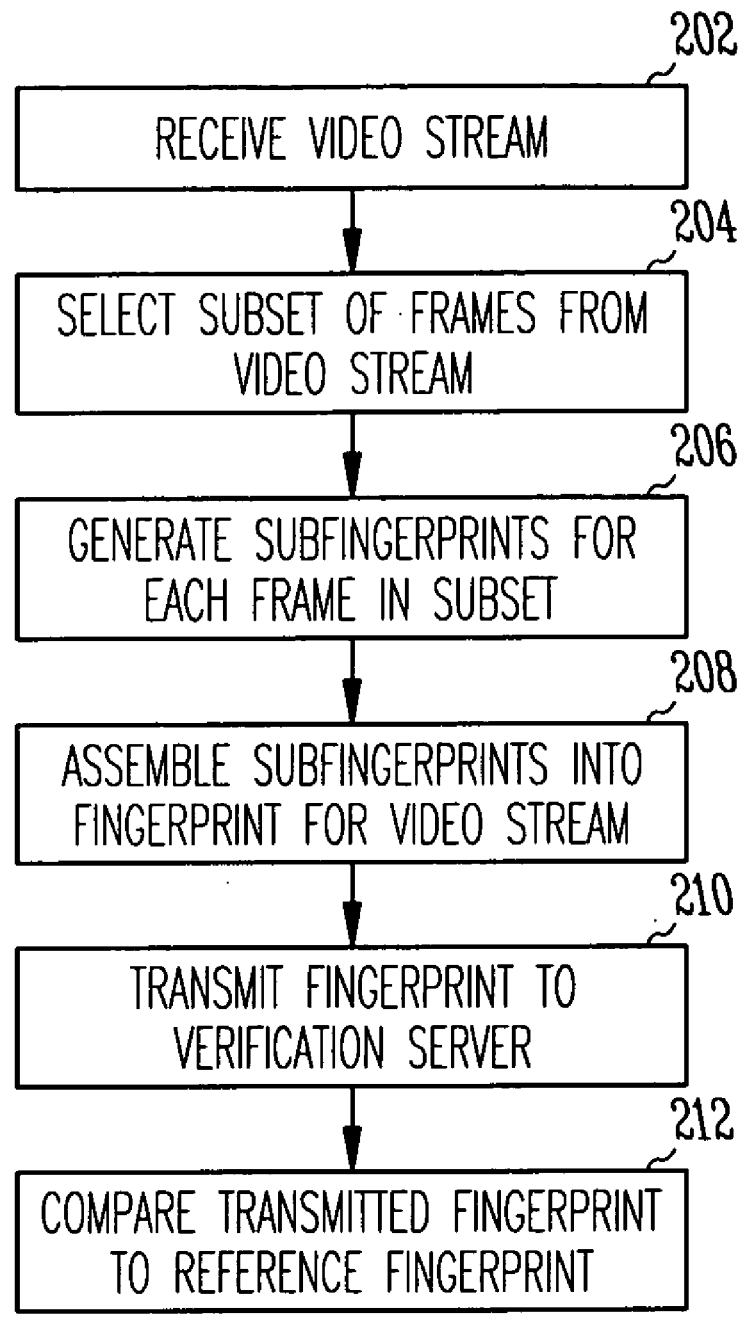
FIGS. 2A and 2B are flowcharts illustrating methods for fingerprinting video data according to embodiments of the invention.
Figure 2B:
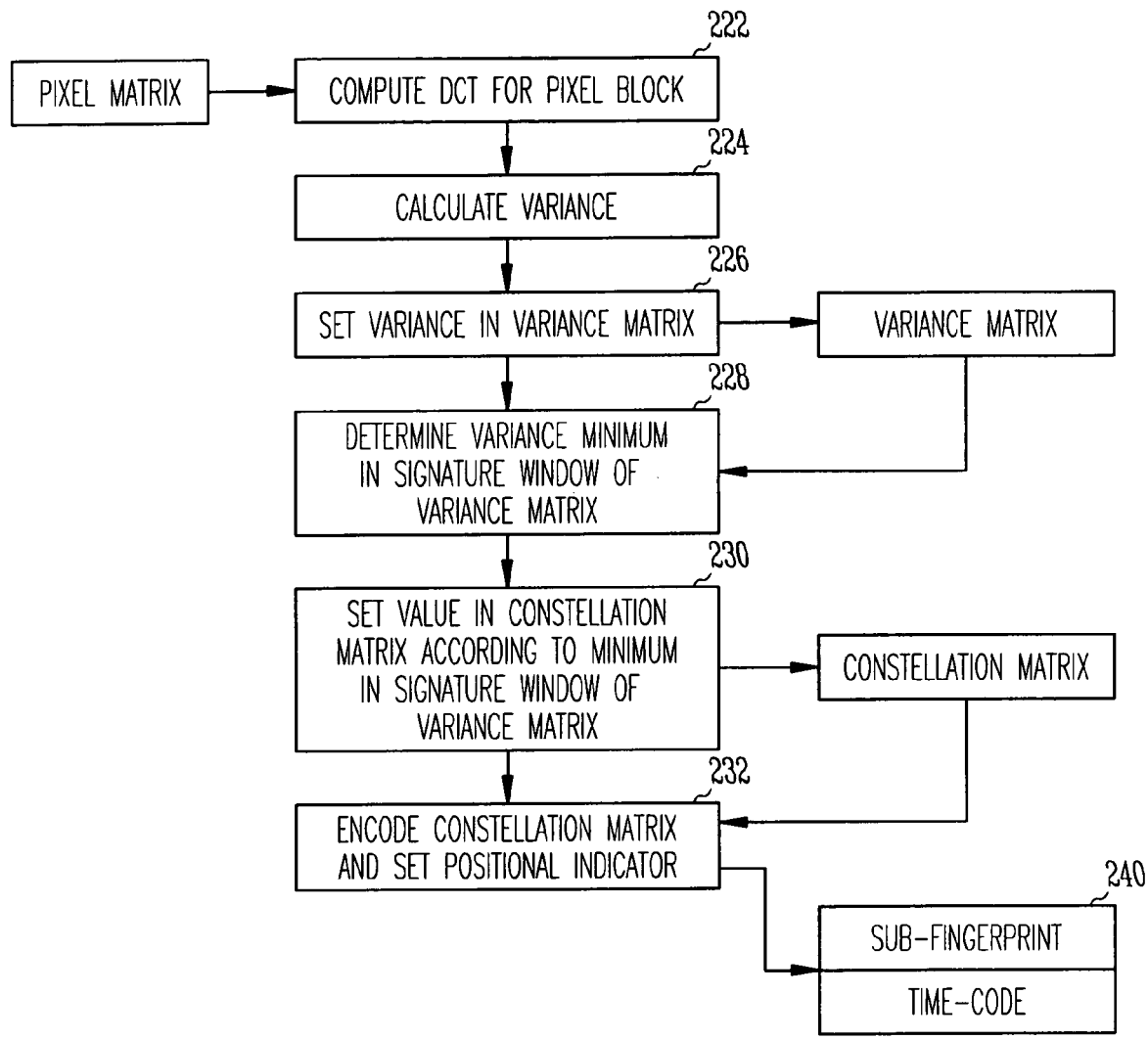

FIGS. 2A and 2B are flowcharts illustrating methods for fingerprinting video data according to embodiments of the invention. The methods may be performed within an operating environment such as that described above with reference to FIG. 1. The methods to be performed by the operating environment constitute computer programs made up of computer-executable instructions. Describing the methods by reference to a flowchart enables one skilled in the art to develop such programs including such instructions to carry out the methods on suitable computers (the processor of the computer executing the instructions from machine-readable media such as RAM, ROM, CD-ROM, DVD-ROM, flash memory etc.). The methods illustrated in FIGS. 2A and 2B are inclusive of the acts performed by an operating environment executing an exemplary embodiment of the invention.

FIG. 2A illustrates a method for fingerprinting a video data stream. The method begins when a system executing the method, such as video receiver 102, receives a video data stream (block 202). In some embodiments, the video data stream conforms to a version of the MPEG (Motion Picture Experts Group) standard for video data. In particular embodiments, the MPEG-2 standard may be used (see ISO/IEC JTC1/SC29/WG11 13818 Generic Coding of Moving Pictures and Associated Audio Information, MPEG-2 International Standard, Nov. 1994 and later versions). In alternative embodiments, the MPEG-4 standard may be used (see ISO/IEC 14496-1:2001 Information technology—Coding of Audio-Visual Objects). It is noted that the systems and methods of the invention are not limited to MPEG video data, and other formats could be readily substituted. Examples of such formats include QUICKTIME® from Apple Computer, Inc., INDEO® from Ligos Corporation, and Microsoft Video for Windows.

Next, the system selects a subset of image frames from the video data (block 204). In some embodiments, the subset is selected on the basis of control codes embedded in the video data. In these embodiments, the control codes are typically created and embedded in the video data when a reference fingerprint is generated for the video data stream. The reference fingerprint comprises a fingerprint of the video data generated prior to its distribution to video receivers in order to be used by a fingerprint verification module for comparison purposes. Candidates for inclusion in the subset typically comprise intra macro-blocks (I-Frames) in an MPEG video data stream. Additional selection criteria may also be used, for example a percentage of candidate frames may be used to reduce the size of the subset.

For each frame in the selected subset, the system generates sub-fingerprints (block 206). These sub-fingerprints are generated based on the pixel data in the image frame. Further details on a method for generating sub-fingerprints are provided below with reference to FIG. 2B.

Next, the generated sub-fingerprints are assembled into a data structure that comprises a fingerprint for the video data stream (block 208). The fingerprint may then be transmitted to a verification server (block 210).

The verification server then compares the generated fingerprint with a reference fingerprint (block 212). The comparison may be used to determine copyrighted video data has been played on a receiver. Additionally, the comparison may determine if the video source has been altered, as alteration will result in a different fingerprint. Further, the location of the alteration may be determined based on the fingerprint and the sub-fingerprints within the fingerprint. For example, a video data stream containing an advertisement may be distributed through a channel. Along the distribution channel, an intermediate party may substitute the original advertisement with a different advertisement. As result, the sub-fingerprints for the substituted advertisement will be different, indicating that the original video data has been altered and where the alteration occurred.

FIG. 2B illustrates a method for generating a sub-fingerprint 240 according to embodiments of the invention. The method may be used by a video receiver to generate a sub-fingerprint as part of block 206 in the method described above with reference to FIG. 2A. However, the method may also be used as part of the fingerprint generation process that generates a reference fingerprint prior to distributing a video data stream.

The method begins by computing a Discrete Cosine Transform (DCT) for a pixel block in an image frame comprising a pixel matrix. In some embodiments, the DCT is calculated for the luminance value of the pixels. Various methods for calculating a DCT are known in the art. In some embodiments, an 8×8 DCT size block is used. However, the invention is not limited to any particular block size for the DCT. For example, a 16×16 block may be used in alternative embodiments. The choice of a particular block size may, at least in part, be determined by performance considerations. For example, a 16×16 DCT is more expensive in terms of performance. Additionally, accelerators are available for 8×8 DCT blocks.

Additionally, those of skill in the art will appreciate that other transformation algorithms besides DCT could be substituted for the DCT transformation and are within the scope of the invention. For example, a weighted wavelet transformation as is known in the art may be used. The choice of transformation may be influenced by the availability of accelerators for the desired transformation and the degree to which the selected transformation is used in other aspects of video processing.

Next, a variance of the DCT coefficients is calculated (block 224). The variance value is then placed in a variance matrix having the same size as the pixel matrix. The variance value is placed in the same position in the variance matrix as the pixel value of the pixel matrix that is the subject of the DCT calculation. Thus, in effect, the luminance pixel value in the pixel matrix is replaced by the variance value in the variance matrix.

Next, the minimum of the variance values in each of a plurality of signature windows is determined (block 228). The variance matrix is segmented into a plurality of signature windows. In some embodiments, the signature window size is 8×8. However, the invention is not limited to any particular size for the signature window. In each signature window, the minimum variance value is determined. The position in the variance matrix having the minimum variance value is marked with a predetermined value in a corresponding position in a constellation matrix having the same size as the variance matrix. Other positions in the signature window that are not the minimum are marked with a different predetermined value. In some embodiments, the minimum value is marked with a "1" (one), while the other positions are marked with a "0" (zero). As a result, the 1's in the constellation matrix represent the parts of the video with most steady visual properties. The distribution of this steadiness represents a signature.

Next, the constellation matrix is encoded into a sub-fingerprint 240 and a positional indicator is set indicating the position of the sub-fingerprint in the video data (block 232).

In some embodiments, run-length encoding is used to code the constellation matrix. However, alternative methods of coding are known in the art and may be used instead of, or in addition to, run-length encoding. Further, in some embodiments, the positional indicator is a time code. However, in alternative embodiments, the positional indicator may be a byte offset in the video data stream.

Figure 3:
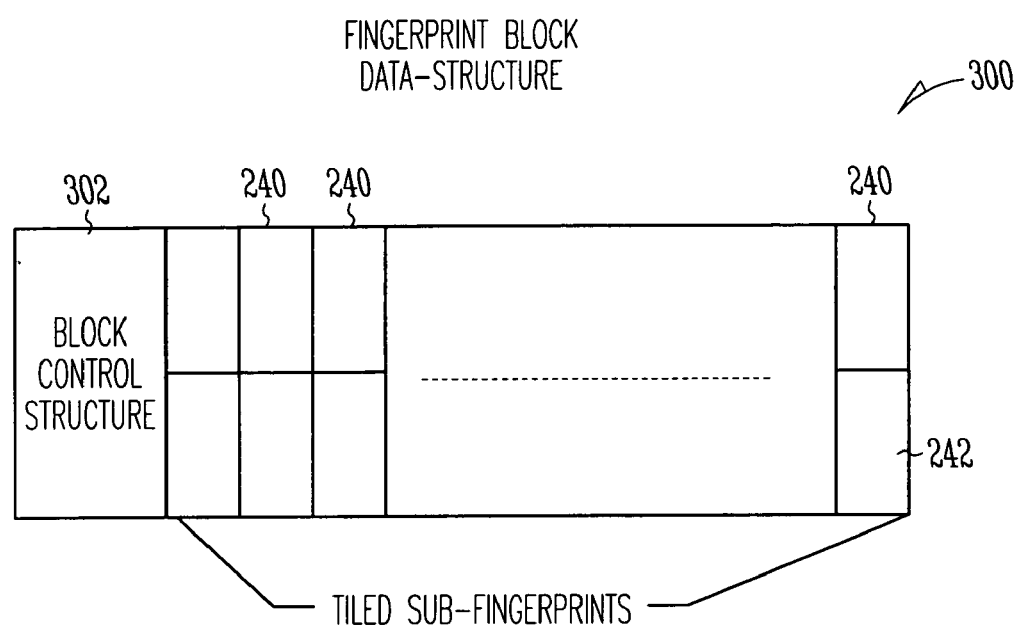
FIG. 3 is a block diagram illustrating a data structure according to embodiments of the invention.

FIG. 3 is a block diagram illustrating a fingerprint data structure 300 according to embodiments of the invention. In some embodiments, data structure 300 includes a block control structure 302 and a series of sub-fingerprints 240. The block control structure 302 of some embodiments contains fields that indicate the sub-fingerprint depth, a CRC (Cyclical Redundancy Check) value, byte offset, algorithm id, version number etc. The series of sub-fingerprints 240 are those generated as described above with respect to FIG. 2. As noted above, a positional indicator 242 is associated with each sub-fingerprint. The positional indicator may be a time code or a byte offset. Data structure 300 may be used when transmitting the fingerprint for a video stream to a verification module.

Figure 4A:
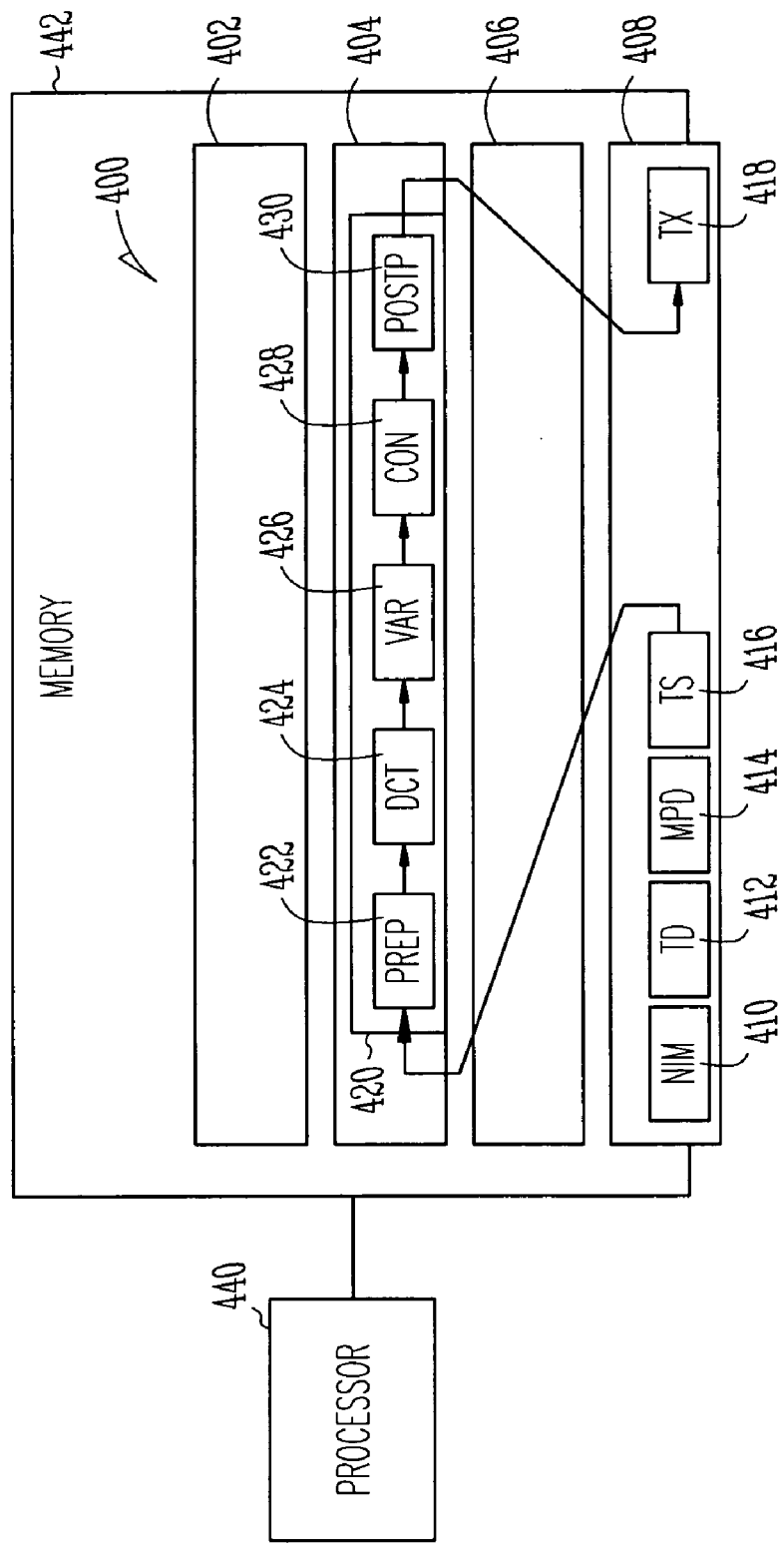
FIGS. 4A and 4B are system diagrams of the major components of a video receiver according to embodiments of the invention.
Figure 4B:
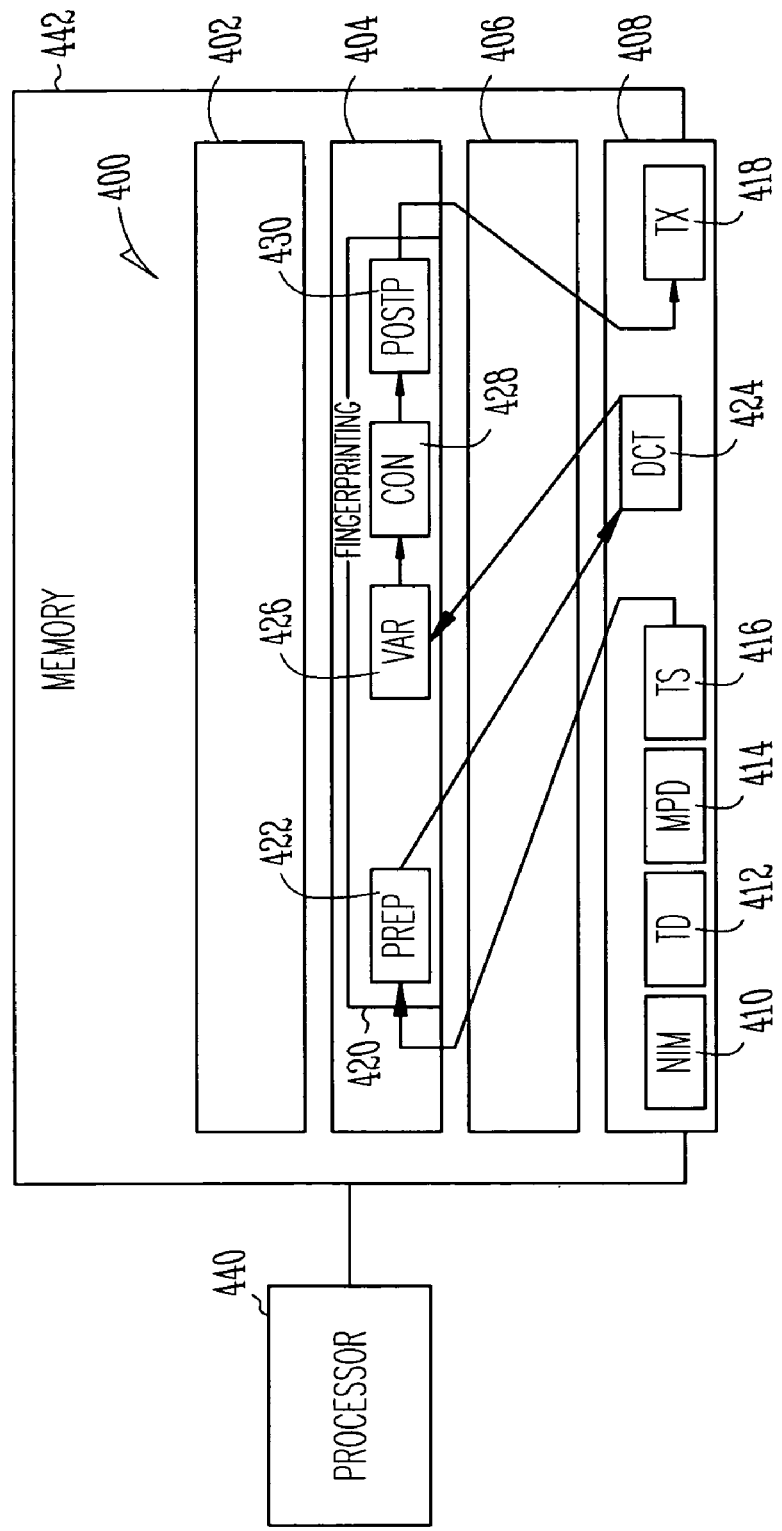

FIGS. 4A and 4B are block diagrams illustrating further details of the major components of a video receiver 102 according to embodiments of the invention. In some embodiments, receiver 102 includes a processor 440 and a memory 442 that implement a layered architecture 400 for a video receiver. Processor 440 may be any type of computational circuit such as, but not limited to, a microprocessor, a complex instruction set computing (CISC) microprocessor, a reduced instruction set computing (RISC) microprocessor, a very long instruction word (VLIW) microprocessor, a graphics processor, a digital signal processor (DSP), or any other type of processor, processing circuit, execution unit, or computational machine. In some embodiments of the invention, processor 440 may be a processor in the Itanium®, Pentium® or Celeron® family of processors available from Intel Corporation, Santa Clara, Calif. Although only one processor 440 is shown, video receiver 102 may include multiple processors. Memory 442 may be any type of memory, including RAM, ROM, or any other device capable of storing computer instructions and/or data.

In some embodiments, the architecture 400 includes a user interface layer 402, an application layer 404, a virtual machine layer 406, and a hardware layer 408.

The UI layer 402 listens to client requests and brokers the distribution of client requests to the layer below it. Below the UI layer 402 is the application layer 404. This layer manages the application state and flow-graph, but is typically resource status unaware. Underneath the application layer 404 is the virtual machine layer 406 for resource management and component parameterization. At the lowest layer is the hardware layer 408. The hardware layer typically includes the drivers and the operating system controlling the video receiver. Each layer has an array of components through which data or control is streamed.

In some embodiments, the hardware layer 408 includes a transport infrastructure. The transport infrastructure includes a NIM (Network Interface Module) 410, which extracts the transport packets comprising video data, and a TD (transport de-multiplexor) 412 which de-multiplexes audio and video packetized elementary streams. An MPD (Mpeg Decoder) 414 decompresses the video and parks the uncompressed video in a virtual storyboard with decompression metadata in a TS (Transport Stream) 416. A temporary workspace manager forwards frames to a fingerprint generator 420. Pre-processor 422 pushes the processing data through the fingerprint processing pipeline, which includes DCT module 424, variance module 426, and constellation module 428 that execute the methods described above with respect to FIG. 2B. The post-processor 430 inter-works with the transmission module 418 to send the generated fingerprint block PDU's (Protocol Data Units) through a back channel of the communication channel to a fingerprint verification module.

FIG. 4B illustrates a video receiver architecture according to alternative embodiments of the invention. The architecture illustrated in FIG. 4B is similar to that represented in FIG. 4A. In architecture 440, a DCT accelerator is used to perform DCT calculation. The DCT accelerator in some embodiments resides in hardware layer 408.

Systems and methods for generating fingerprint data for video data have been described. The systems and methods of various embodiments provide advantages over previous systems. For example, in some embodiments, the overhead due to fingerprinting, is estimated to be less than 1% (assuming DCT computation is offloaded). Additionally, management overhead to control fingerprinting in some embodiments (control codes and signature PDU) is estimated to increase the bit-rate by less than 0.0001%. As an example, for an hour-long program segment, fingerprint block size is estimated to be approximately 64 kbits (256*256). Additionally, the systems and methods of the embodiments of the invention typically fit with existing video infrastructure with relatively minor alteration.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

What is claimed is:

1. A method comprising:
    receiving a video stream comprising a plurality of image frames, each image frame comprising a matrix of pixels;
    selecting a subset of the image frames;
    for each image frame in the subset determining a sub-fingerprint for the image frame,
wherein determining the sub-fingerprint for the image frame includes:
    computing a discrete cosine transformation (DCT) block for a pixel block surrounding a pixel, said DCT block having coefficients,
    computing an estimation of a variance of the coefficients,
    setting a variance value in a variance matrix with the estimation of the variance, wherein the value is set at a position in the variance matrix corresponding to the pixel position in the image frame matrix,
    determining a minimum variance value in a signature window of the variance matrix enclosing the pixel position, and
    setting a first predetermined value representing the minimum variance in a constellation matrix at a position corresponding to the minimum variance value and setting all other positions in the signature window to a different predetermined value; and assembling the sub-fingerprints into a fingerprint for the video stream.

2. The method of claim 1, further comprising:
transmitting the fingerprint to a fingerprint verification system; and
comparing the fingerprint to a predetermined fingerprint for the video stream.

3. The method of claim 1, wherein selecting the subset of the image frames includes reading control codes from the video stream, said control codes identifying the subset of the image frames.

4. The method of claim 1, further comprising encoding the sub-fingerprint.

5. The method of claim 4, wherein the encoding comprises a run-length encoding.

6. The method of claim 1, wherein the DCT block has a size of eight by eight.

7. The method of claim 1, wherein the signature window has a size of eight by eight.

8. A device comprising:
a processor;
a network interface module operable to receive video data, the video data comprising a plurality of frames, each frame comprising a pixel matrix;
a memory coupled to the processor for storing the pixel matrix, a variance matrix, and a constellation matrix; and
a fingerprint generation module executing on the processor and operable to:
determine a discrete cosine transformation (DCT) block for a pixel block surrounding a pixel in the pixel matrix, said DCT block having coefficients;
compute an estimation of a variance of the coefficients;
set a variance value in the variance matrix with the estimation of the variance, wherein the value is set at a position in the variance matrix corresponding to the pixel position in the image frame matrix;
determine a minimum variance value in a signature window of the variance matrix enclosing the pixel position; and
set a first predetermined value representing the minimum variance in the constellation matrix at a position corresponding to the minimum variance value and setting all other positions in the signature window to a different predetermined value.

9. The device of claim 8, wherein the fingerprint generation module is further operable to run-length encode the sub-fingerprint.

10. The device of claim 8, wherein the DCT block has a size of eight by eight.

11. The device of claim 8, wherein the signature window has a size of eight by eight.

12. The device of claim 8 further comprising a DCT accelerator operable to calculate the DCT coefficients.

13. The device of claim 8, wherein the processor and memory are housed in a set-top box.

14. The device of claim 8, wherein the processor and memory are housed in a personal computer.

15. A system comprising
a video sewer communicably coupled to a communication channel and operable to transmit a video data stream through the communication channel;
a video receiver communicably coupled to the communication channel and operable to:
receive the video data stream;
determine a subset of images in the video data stream;
calculate a sub-fingerprint for each of the subset of images, wherein the calculations of the sub-fingerprint for the image frame includes operations to:
compute a discrete cosine transformation (DCT) block for a pixel block surrounding a pixel, said DCT block having coefficients,
compute an estimation of a variance of the coefficients,
set a variance value in a variance matrix with the estimation of the variance, wherein the value is set at a position in the variance matrix corresponding to the pixel position in the image frame matrix,
determine a minimum variance value in a signature window of the variance matrix enclosing the pixel position, and
set a first predetermined value representing the minimum variance in a constellation matrix at a position corresponding to the minimum variance value and setting all other positions in the signature window to a different predetermined value;
assemble the sub-fingerprint for each of the subset of images into a fingerprint; and
transmit the fingerprint to a fingerprint verification module.

16. The system of claim 15, further comprising a fingerprint mismatch database operable to store a reference fingerprint for the video data stream and wherein the fingerprint verification module is operable to compare the fingerprint to the reference fingerprint.

17. The system of claim 15, wherein the fingerprint verification module is located with the video server.

18. A machine-readable medium having machine executable instructions for performing a method, the method comprising:
receiving a video stream comprising a plurality of image frames, each image frame comprising a matrix of pixels;
selecting a subset of the image frames;
for each image frame in the subset determining a sub-fingerprint for the image frame, wherein determining the sub-fingerprint for the image frame includes:
computing a discrete cosine transformation (DCT) block for a pixel block surrounding a pixel, said DCT block having coefficients,
computing an estimation of a variance of the coefficients,
setting a variance value in a variance matrix with the estimation of the variance, wherein the value is set at a position in the variance matrix corresponding to the pixel position in the image frame matrix,
determining a minimum variance value in a signature window of the variance matrix enclosing the pixel position, and
setting a first predetermined value representing the minimum variance in a constellation matrix at a position corresponding to the minimum variance value and setting all other positions in the signature window to a different predetermined value; and
assembling the sub-fingerprints into a fingerprint for the video stream.

19. The machine-readable medium of claim 18, wherein the method further comprising:
transmitting the fingerprint to a fingerprint verification system; and comparing the fingerprint to a predetermined fingerprint for the video stream.

20. The machine-readable medium of claim 18, wherein selecting the subset of the image frames includes reading control codes from the video stream, said control codes identifying the subset of the image frames.

21. The machine-readable medium of claim 18, wherein the method further comprises encoding the sub-fingerprint.

22. The machine-readable medium of claim 21, wherein the encoding comprises a run-length encoding.

23. The machine-readable medium of claim 18, wherein the DCT block has a size of eight by eight.

24. The machine-readable medium of claim 18, wherein the signature window has a size of eight by eight.

* * * * *

UNITED STATES PATENT AND TRADEMARK OFFICE
CERTIFICATE OF CORRECTION

| | | |
|---|---|---|
| PATENT NO. | : 7,336,841 B2 | Page 1 of 1 |
| APPLICATION NO. | : 10/808981 | |
| DATED | : February 26, 2008 | |
| INVENTOR(S) | : Neogi | |

It is certified that error appears in the above-identified patent and that said Letters Patent is hereby corrected as shown below:

In column 7, line 63, in Claim 15, delete "sewer" and insert -- server --, therefor.

Signed and Sealed this

Twenty-third Day of September, 2008

JON W. DUDAS
*Director of the United States Patent and Trademark Office*